Dec. 3, 1963 G. PODZUWEIT 3,113,039
METHOD OF PRODUCING COATINGS ON HEAT-RESISTING SUPPORTS
Filed July 13, 1960
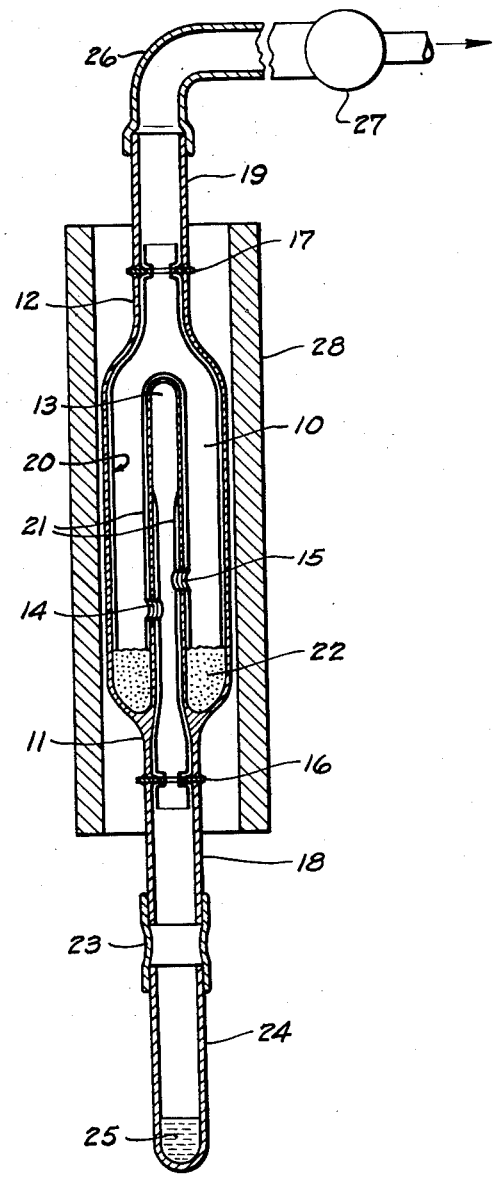
INVENTOR:
GERT PODZUWEIT
BY
Morgan, Finnegan, Durham & Pine
ATTORNEYS.

United States Patent Office 3,113,039
Patented Dec. 3, 1963

3,113,039
METHOD OF PRODUCING COATINGS ON HEAT-RESISTING SUPPORTS
Gert Podzuweit, Unterageri, Zug, Switzerland, assignor to Landis & Gyr, A.G., Zug, Switzerland, a body corporate of Switzerland
Filed July 13, 1960, Ser. No. 42,590
Claims priority, application Switzerland Aug. 5, 1959
1 Claim. (Cl. 117—212)

This invention relates to a method of producing coatings and more particularly a method of producing coatings on heat-resisting supports.

Various methods are already known for producing electrically conducting, non-metallic coatings, particularly of metallic oxides, on heat-resisting supports of electrical insulating materials such as glass ceramics, porcelain. According to these methods, the support to be coated is heated to a temperature of 300 to 800° C. for example, and brought into contact, in the hot state, with certain chemical substances which contain the constituents of the coating to be formed. A film forms on the surface of the support through a chemical reaction. The said contact between the heated support and the substances necessary for forming the coating was hitherto effected either by immersing the heated support in a liquid containing the substances, by dusting the heated support with the substances by means of a spray gun, by applying a solution containing the substances in the form of mist, by vaporizing the solution of the substances dried in a filter paper by heating and burning the filter paper or by vaporizing tin chloride crystals by heating. The constitution and properties of the resulting coatings, such as thickness, adhesion to the support, electrical conductivity, work function of electrons, coloring, homogeneity, temperature coefficient of the electrical resistance, etc., depend largely on the method used and the manufacturing conditions, such as preliminary treatment of the support, composition and age of the solution used, temperature variations during the reaction, duration of the action, pressure, air humidity, etc. Thus, if it is desired to produce uniform coatings with certain reproducible characteristics, numerous conditions have to be accurately adhered to, which is generally very difficult. The manufacturing methods hitherto known therefore entail considerable disadvantages. Furthermore, many of the known methods cannot be used when the support to be coated has a complicated shape so that the stream of gas, vapor or mist or the immersion liquid cannot act with the same intensity and for the same period on all the points of the support to be coated.

The object of the present invention is to remove, to a large extent, the disadvantages and manufacturing difficulties outlined.

This and other objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention relates to a method for producing coatings on heat-resisting supports and consists essentially in that the surface of the support to be treated and a predetermined quantity of the reagents necessary to form the coating are introduced into an enclosed chamber, the part of the support to be provided with a coating is heated, the chamber is evacuated and then the reagents are heated in such a manner that they all vaporize at least substantially at the same time and then form a uniform coating on the heated surface of the support which is exposed to the evacuated chamber.

The invention consists in the novel steps, methods, compositions, combinations and improvements herein shown and described.

The method according to the invention is largely independent of external influences in the production of the coating and, in addition, enables the reagents to be applied to the surface to be coated in such a manner that a film of uniform thickness is formed all over it even when the support has a complicated shape.

Further advantages and details of the invention appear from the claim, the description and the accompanying drawing with reference to which the method according to the invention will be explained by way of example.

The single FIGURE illustrates diagrammatically and in section the production of non-metallic electrodes in a discharge tube.

A hollow body 10 of glass has the external form of a tube which is reduced at the two end portions 11 and 12. In the interior of the hollow body 10 is a piece of tubing 13 which likewise consists of glass and which is fused, at one end, to the end 11 of the tube. The other end of the inner piece of tubing 13 is closed. Through two lateral apertures 14 and 15 in the piece of tubing 13, its interior is in communication with that of the hollow body 10. Fused onto the reduced tube ends 11 and 12, at each end is a perforated metal disc 16, 17 respectively, preferably of molybdenum, which in turn is fused to a tube connection 18, 19 respectively, which is arranged coaxially with the respective tube end 11, 12 of the hollow body 10.

The problem now is to produce a non-metallic electrode coating 20, which is connected to the disc 17, on the inner surface of the hollow body 10 and a non-metallic electrode coating 21, which is connected to the disc 16, on the outer surface of the inner piece of tubing 13. For this the procedure may be, for example, as follows:

Through the tube connection 19, the hollow body 10 is filled with a small quantity of powdered, heat-resisting material 22, which may consist for example of graphite, chamotte, mica, glass, etc., which is later removed. A small glass vessel 24, which contains, in solid form or in solution, a predetermined quantity of reagents 25 necessary for forming the coatings 20 and 21, is connected, by means of a rubber tube 23, to the lower tube connection 18. A vacuum pump 27 is connected by means of a rubber tube 26 to the upper tube connection 19. An electrical heating device 28 is arranged round the hollow body 10 and round the discs 16 and 17.

After or while the parts 10, 11, 12, 13, 16 and 17 to be coated have been or are being heated to a temperature of 500° C. for example, by means of the heating device 28, the interior of the hollow body 10, of the inner piece of tubing 13 and of the vessel 24 is evacuated. When a sufficiently reduced pressure has been obtained, the vessel 24 is quickly heated, for example by means of a gas flame, to such a temperature that the reagents 25 which are contained in the vessel 24, all vaporize at least substantially at the same time. The resulting vapor and any liquid particles which may be contained therein, spread uniformly over the evacuated chamber and come into contact with the surfaces of the vacuum chamber which have been heated by the heating device 28, as a result of which an electrically conductive coating of uniform thickness forms on said surfaces as a result of a chemical reaction. After this, air or another gas may be admitted to the evacuated chamber and the coated members cooled. Finally, the powdered material 22 is shaken out of the hollow body 10 as a result of which the two electrode coatings 20 and 21 are separate from one another as desired.

Since the electrode coating 20 also covers the inner circumference of the annular disc 17 and adheres thereto as firmly as to the inner surface of the hollow body 10, the outer circumference of the disc 17 may satisfactorily be used for the connection of the electrode 20 to external electrical conductors. The electrode coating 21 penetrates through the apertures 14 and 15 in the piece of tubing 13 and continues on the inner surface of the latter and of the reduced tube end 11 and also covers the inner circumference of the annular disc 16 so that its outer circumference can serve for connection of the electrode 21 to electrical conductors.

In order to obtain a distinct boundary of the electrode coatings 20 and 21 in the interior of the tube connections 18 and 19, care can be taken, by means of a suitable construction of the heating device 28, to ensure that a sharp drop in temperature occurs at the desired boundary points. However, if it is desired to vary the boundary points independently of the extent of the effective heating zones, the inner surfaces of these tube connections may be partially provided, before the beginning of the coating process, with a heat-resisting coating which can later be removed together with the reagents precipitated thereon. Such a coating for covering the surfaces not to be coated may consist, for example, of $Al_2O_3$, MgO or graphite. A similar coating could also be used instead of the powdered material 22 in order to be able to produce subsequently the desired separation between the electrodes 20 and 21.

The delimitation of the electrode coatings 20 and 21 in the tube connections 18 and 19 may also be effected by means of inserted pieces of tube which are later removed from the connections 18 and 19.

In the example described above of carrying out the method for producing electrically conducting coatings, the support to be coated itself forms a part of the boundary of the chamber which is evacuated by the pump 27. This need not necessarily be so in every case as the following second example shows:

A plurality of quartz filaments are to be provided externally with an electrically conducting, non-metallic layer. The quartz filaments, running vertically, without mutual contact, are suspended, by means of a suspension device, in a suitable auxiliary vessel. The auxiliary vessel is connected on the one hand to the vacuum pump 27 and on the other hand to the vessel 24 containing the reagents. An electrical heating device for heating the quartz filaments to be coated may be arranged either likewise in the interior of the auxiliary vessel or around the auxiliary vessel. After the evacuation of the auxiliary vessel and of the vessel containing the reagents, the latter is quickly heated so that the reagents all vaporize substantially simultaneously and form the desired coating on the previously heated surfaces, and particularly on the quartz filaments.

Finally, mention may be made of the fact that applying the example described first, even compartively narrow capillary tubes can be coated internally.

The advantages of the method according to the invention are essentially as follows:

As a result of the fact that the reaction takes place under vacuum in a chamber which is sealed off from the outside, it is independent of external influences such as atmospheric pressure, and air humidity. The reagents are applied in comparatively small quantities to the supports to be coated so that these are not appreciably cooled in contrast to the irregular and severe cooling by a current of gas, vapor or mist or in the immersion method. According to the laws of gas kinetics, the volatile particles, on vaporization of the reagents, spread more easily and uniformly over the whole evacuated space than in a gas atmosphere. Furthermore, the surface of the support to be coated is decontaminated by the cooperation of temperature and vacuum, immediately before the application of the layer, which, according to experience in the vacuum technique, contributes to an increase in the adhesive capacity of the coating on the support. Furthermore, the method provides results which can be reproduced better than the methods hitherto known and mentioned hereinbefore. The need for a vacuum pump does not involve any significant complication because a simple water-jet vacuum pump meets the practical requirements. In return, additional devices for atomizing a solution, and regulating members such as valves, nozzles, etc., for such devices, are dispensed with. The strongly corrosive vapors which are harmful to health and which are formed during the production of metallic oxide layers, are retained by the boundaries of the vacuum chamber and are drawn off by the vacuum pump and rendered harmless.

It is of significant importance, that the method described affords the possibility of producing non-metallic electrodes which have very complicated shapes as is frequently the case, for example, in the electronic art. Hitherto, such electrodes had to be made of metal parts because the known methods for producing non-metallic coatings did not permit of satisfactory solutions in these cases. Apart from the advantages offered by non-metallic electrodes in themselves, there is considerable simplification in the production of devices comprising such electrodes, as a result of the fact that complicated and length methods of treatment for the stress relief of glass lengthy methods of treatment for the stress relief as the decontamination of the metal parts are eliminated.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

In the production of an electron control device comprising a hollow, multiple chamber glass vessel having first and second inlet connections adapted to be ultimately sealed and having non-metallic conductive electrodes formed as thin layers on the inner walls thereof, the mehod of producing said electrodes comprising the steps of:

a. filling through said first inlet connection that part of said vessel which is to be free of said electrodes with heat resistant pulverulent material to mask said part;

b. connecting a reagent vessel containing a predetermined quantity of the reagents necessary to form said electrodes to said second inlet connection;

c. connecting a vacuum pump to said first inlet connection;

d. heating said electrode vessel and first and second connections by inserting said electrode vessel within a generally cylindrical heating device of a length sufficient to heat said vessel and said first and second inlet connections;

e. evacuating said electrode vessel by means of said vacuum pump;

f. rapidly heating said reagent vessel to a temperature sufficient to cause said reagents to evaporate substantially at the same time, to be transferred to the heated, unmasked interior parts of said electrode vessel, and to form said electrodes by chemical reaction of the resultant vapors at said unmasked heated parts of said electrode vessel; and g. cooling said electrode vessel, removing said masking material, cleaning said vessel.

(References on following page)

References Cited in the file of this patent

UNITED STATES PATENTS

| | | |
|---|---|---|
| 986,558 | Farkas | Mar. 14, 1911 |
| 1,497,417 | Weber | June 10, 1924 |
| 2,139,640 | Mall et al. | Dec. 6, 1938 |
| 2,698,812 | Schladitz | Jan. 4, 1955 |
| 2,711,973 | Wainer et al. | June 28, 1955 |
| 2,785,997 | Marvin | Mar. 19, 1957 |
| 2,953,484 | Tellkamp | Sept. 20, 1960 |
| 2,966,427 | Breining | Dec. 27, 1960 |
| 2,970,064 | Bolton | Jan. 31, 1961 |
| 2,971,867 | Lytle | Feb. 14, 1961 |
| 2,995,461 | Boicey et al. | Aug. 8, 1961 |
| 3,019,137 | Hanlet | Jan. 30, 1962 |

FOREIGN PATENTS

| | | |
|---|---|---|
| 769,825 | Great Britain | Mar. 13, 1957 |
| 791,667 | Great Britain | Mar. 5, 1958 |